(12) United States Patent
Allison

(10) Patent No.: US 6,546,230 B1
(45) Date of Patent: Apr. 8, 2003

(54) METHOD AND APPARATUS FOR SKILLS ASSESSMENT AND ONLINE TRAINING

(75) Inventor: Samantha Allison, Newton, MA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/476,054

(22) Filed: Dec. 31, 1999

(51) Int. Cl.$^7$ ................................................ G09B 3/00
(52) U.S. Cl. ...................... 434/350; 434/322; 434/262; 434/327
(58) Field of Search ................................ 434/262, 350, 434/322, 323, 327

(56) References Cited

U.S. PATENT DOCUMENTS

| | | | | |
|---|---|---|---|---|
| 4,360,345 A | * | 11/1982 | Hon | 434/262 |
| 4,798,543 A | * | 1/1989 | Spiece | 434/323 |
| 5,454,722 A | * | 10/1995 | Holland et al. | 434/271 X |
| 5,590,057 A | * | 12/1996 | Fletcher et al. | 702/182 X |
| 5,692,906 A | * | 12/1997 | Corder | 434/156 |
| 5,788,508 A | * | 8/1998 | Lee et al. | 434/350 |
| 5,791,908 A | * | 8/1998 | Gillio | 434/262 |
| 5,810,747 A | * | 9/1998 | Brudny et al. | 600/595 X |
| 6,039,575 A | * | 3/2000 | L'Allier et al. | 434/323 X |
| 6,064,856 A | * | 5/2000 | Lee et al. | 434/350 X |
| 6,157,808 A | * | 12/2000 | Hollingsworth | 434/350 X |
| 6,162,060 A | * | 12/2000 | Richard et al. | 434/118 |
| 6,261,103 B1 | * | 7/2001 | Stephens et al. | 434/276 X |

* cited by examiner

Primary Examiner—Valencia Martin-Wallace
Assistant Examiner—Chanda Harris
(74) Attorney, Agent, or Firm—Fletcher, Yoder & Van Someren

(57) ABSTRACT

A technique is disclosed for testing and training health care professionals. Competency tests are stored on machine readable media and transmitted via network connections to remote provider systems, such as workstations or diagnostic systems. A health care professional can take a competency test on a particular topic and input his/her responses at the remote provider system. The health care professional's responses are evaluated, and an assessment of his/her skills displayed at the provider system. The assessment particularly points out those areas, if any, where the health care professional's knowledge is deficient. If the health care professional has any areas which need improvement, a list of relevant courses is also displayed at the provider system. The health care professional may then select a desired course from the user interface. The machine readable media maintains a record of the health care professional's assessment as well as a list of completed courses. This information may then be provided to a licensing entity for credit.

21 Claims, 11 Drawing Sheets

METHOD AND APPARATUS FOR SKILLS ASSESSMENT AND ONLINE TRAINING

FIELD OF THE INVENTION

The present invention relates generally to the field of medicine. More particularly, the present invention relates to an online system and method for providing to health care professionals continuing medical education and assessing their skills and competency.

BACKGROUND OF THE INVENTION

Knowledge is crucial in the medical field. In order for health care professionals (e.g., doctors, nurses, biomedical engineers and administrators) to best manage their patients' health, it is important for them to stay up to date in their field of practice. Relevant knowledge includes information on the latest research and development for the diagnosis, treatment and prevention of various illnesses. Medical diagnostic imaging systems provide invaluable tools for identifying, diagnosing and treating physical conditions and greatly reduce the need for surgical diagnostic intervention. In many instances, final diagnosis and treatment proceed only after an attending physician or radiologist has complemented conventional examinations with detailed images of relevant areas and tissues via one or more diagnostic imaging modalities. Accordingly, educating and training health care professionals as to both general and specific health care topics, including special features of and the use of particular diagnostic systems, are desirable to improve both productivity and patient care.

Typical channels through which such information is dispensed to health care professionals include classroom training, audio and video tapes, CD-ROM, medical symposia, seminars, journals and other publications. One disadvantage of classroom training, symposia and seminars is that they are only offered at certain times, which may conflict with an interested health care professional's schedule. And although journals and other publications may provide a wealth of information, the information contained in these publications may be difficult to locate and not readily accessible to all health care professionals. Online courses have become available, however, none of these channels of information provides an initial assessment of a health care professional's skills nor keeps track of those skills or training that the health care professional gains. This assessment and tracking information can aid both health care institutions and professionals in assessing the skill levels available to best meet the needs of their patients. In addition, maintaining a record of a health care professional's skills or training can facilitate a means to identify the pool of available knowledge at a health care facility, as well as enable monitoring of continuing education courses and credit for satisfactory course completion.

There is a need, therefore, for a system and method for educating and training health care professionals that includes a way of assessing their skills. The system should be easily accessible and provide information on a wide range of topics. It is also desirable for the system to maintain a record of the skills of each health care professional and the training that the professional receives. This record can assist health care institutions to determine the skill levels of their staff as well as aid health care professionals to plan necessary continuing education courses. The system may also be linked with state licensing entities or other organizations to facilitate credit for continuing medical education.

SUMMARY OF THE INVENTION

The present invention provides a novel approach to educating and training health care professionals. The invention is directed to an online, interactive method for training and testing health care professionals who are located at remote sites. The method includes storing competency tests and training courses on machine readable media and establishing a network link with a remote system. The remote system can be a workstation (e.g., a personal computer) or a diagnostic system with an interactive platform, which enables an end-user to search and select competency tests and training courses as well as to store a personal record of such information. In accordance with one preferred embodiment, the competency tests and training courses are stored at a central training facility and are accessed from a remote diagnostic system or workstation via the interactive platform and an intranet. In accordance with another preferred embodiment, the information stored at the training facility is accessed from a workstation at the remote facility via the Internet. The interactive platform of the medical diagnostic system comprises a web or network browser, which enables the end-user to search and select competency tests and training courses directly from the operator's console.

The present invention is also directed to a system including a central training facility, a plurality of remotely located workstations and medical diagnostic systems, and communications circuitry for establishing connections therebetween. The diagnostic systems may include different imaging modalities, such as computed tomography (CT), magnetic resonance (MR), nuclear medicine (NM), ultrasound, and x-ray (both conventional film and digital or digitized imaging). Preferably, the central training facility includes competency tests and training courses geared toward a variety of topics, including operation of the scanning equipment, how to perform patient examinations or how to review images for each imaging modality. The tests and courses are preferably classified by profession, specialty, imaging modality, and so forth. The system can also be linked with a state licensing entity or other organization to provide a health care professional's transcript or record of completed courses and facilitate credit for certification and continuing education.

DETAILED DESCRIPTION OF THE INVENTION

Figure 1:
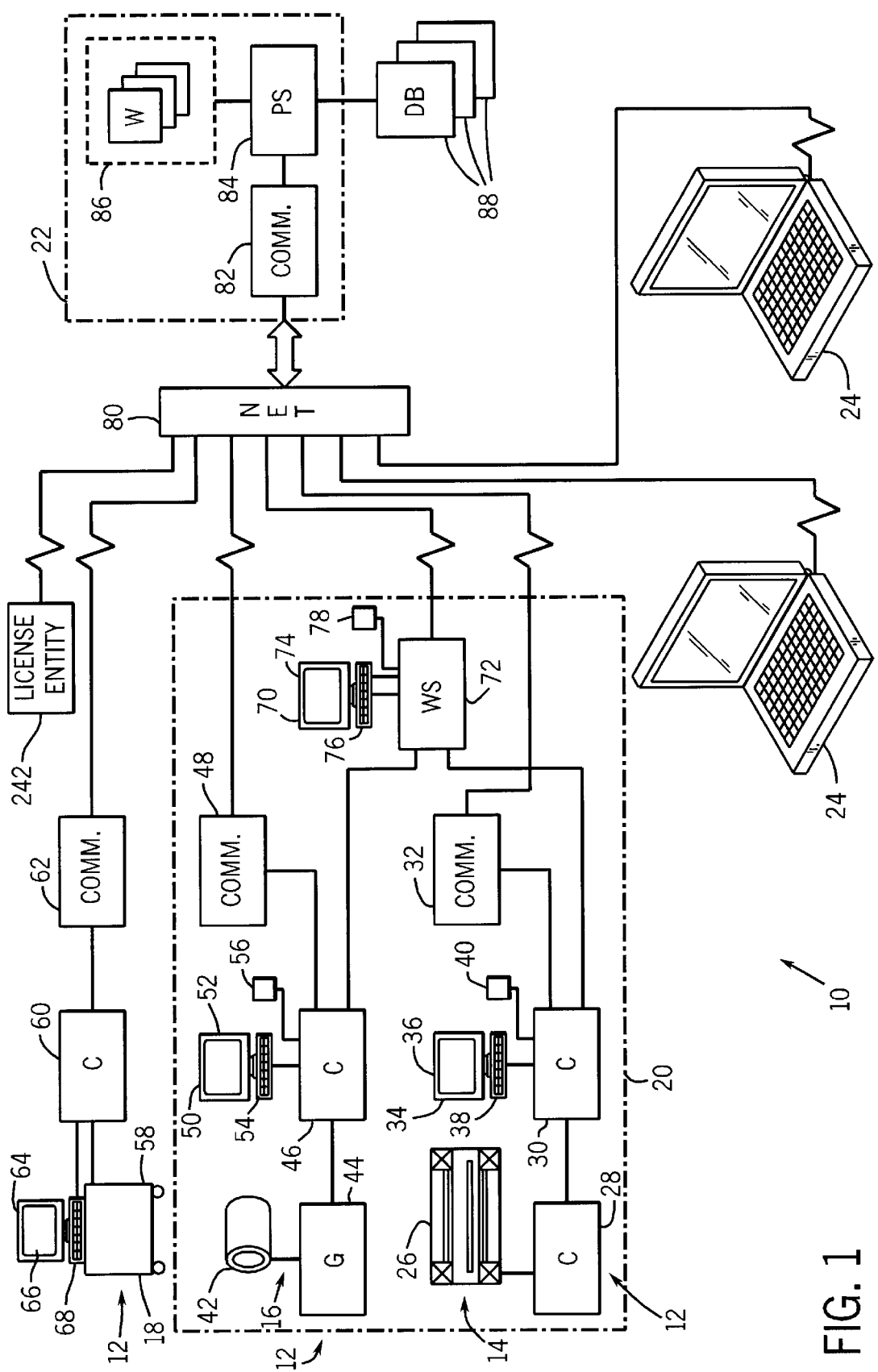
FIG. 1 is a diagrammatical representation of a series of medical diagnostic systems and workstations coupled to a training facility via a network connection for providing data interchange therebetween.

Turning now to the drawings, and referring first to FIG. 1, a service and training system 10 is illustrated for providing remote training and education to a plurality of medical diagnostic systems 12. In the embodiment illustrated in FIG. 1, the medical diagnostic systems include a magnetic resonance imaging (MRI) system 14, a CT system 16, and an ultrasound imaging system 18. Each of these diagnostic systems includes image data acquisition and processing circuitry and is sometimes referred to as a "scanner" if physical or electronic scanning occurs as part of the imaging process. The particular components of the system and related circuitry, of course, differ greatly between modalities due to their different physics and data processing requirements. The diagnostic systems may be positioned in a single location or facility, such as a medical facility 20, or may be remote from one another as shown in the case of ultrasound system 18. The diagnostic systems are connected to a centralized training facility 22. Moreover, a plurality of workstations 24 may also be coupled in the training facility as described more fully below.

In the exemplary embodiment of FIG. 1, several different system modalities are provided with remote access to the training facility. These and other modalities may be similarly access the training facility. In general, however, the present technique is particularly well suited to providing remote training to a wide variety of medical diagnostic system modalities, including MRI systems, CT systems, ultrasound systems, positron emission tomography (PET) systems, nuclear medicine systems, and so forth, as well as to remote workstations. Moreover, the various modality systems and workstations may be of different type, manufacture, and model.

Depending upon the modality of the systems, various subcomponents or subsystems will be included. In the case of MRI system 14, such systems will generally include a scanner 26 for generating pulsed magnetic fields and for collecting signals from emissions by gyromagnetic material within a subject of interest. The scanner is coupled to a control and signal detection circuit 28 which, in turn, is coupled to a system controller 30. System controller 30 includes a uniform platform for interactively exchanging requests, messages and data with training facility 22, as described more fully below. System controller 30 is linked to a communications module 32, which may be included in a single or separate physical package from system controller 30. System controller 30 is also linked to an operator station 34 which will typically include a computer monitor 36, a keyboard 38, as well as other input devices 40, such as a mouse. In a typical system, additional components may be included in system 14, such as a printer or photographic system for producing reconstructed images based upon data collected from scanner 14. Although reference is made herein generally to "scanners" in diagnostic systems, that term should be understood to include medical diagnostic data acquisition equipment generally, not limited to image data acquisition, as well as to picture archiving communications and retrieval systems, image management systems, facility or institution management systems, viewing systems and the like, in the field of medical diagnostics. More particularly, equipment benefiting from the present techniques may include imaging systems, clinical diagnostic systems, physiological monitoring systems and so forth.

Similarly, CT system 16 will typically include a scanner 42 which detects portions of x-ray radiation directed through a subject of interest. Scanner 42 is coupled to a generator and controller, as well as to a signal acquisition unit, represented collectively at reference numeral 44, for controlling operation of an x-ray source and gantry within scanner 42, and for receiving signals produced by a detector array moveable within the scanner. The circuitry within the controller and signal acquisition components is coupled to a system controller 46 which, like controller 30 mentioned above, includes circuitry for commanding operation of the scanner and for processing and reconstructing image data based upon the acquired signals. System controller 46 is linked to a communications module 48, generally similar to communications module 32 of MRI system 14, for transmitting and receiving data for remote service of system 16. Also, system controller 46 is coupled to an operator station 50 which includes a computer monitor 52, a keyboard 54, as well as other input devices 56, such as a mouse. Moreover, like MRI system 14, CT system 16 will generally include a printer or similar device for outputting reconstructed images based upon data collected by scanner 42.

Other modality devices will include circuitry and hardware particularly configured for acquiring or producing signals in accordance with their particular design. In particular, in the case of ultrasound system 18, such systems will generally include a scanner and data processing unit 58 for transmitting ultrasound signals into a subject of interest, and for acquiring resultant signals, which are processed for reconstructing a useful image. The system includes a system controller 60 which regulates operation of scanner 58 and which processes acquired signals to reconstruct the image. Moreover, system 18 includes a communications module 62 for transmitting requests, messages and data between system controller 60 and training facility 22. System 18 also includes an operators station 64, including a monitor 66, as well as input devices such as a keyboard 68.

Where more than one medical diagnostic system is provided in a single facility or location, as indicated in the case of MRI and CT systems 14 and 16 in FIG. 1, these may be coupled to a management station 70, such as in a radiology department of a hospital or clinic. The management station may be linked directly to controllers for the various diagnostic systems, such as controllers 30 and 46 in the illustrated embodiment. The management system may include a computer workstation or personal computer 72 coupled to the system controllers in an intranet configuration, in a file sharing configuration, a client/server arrangement, or in any other suitable manner. Moreover, management station 70 will typically include a monitor 74 for viewing system operational parameters, analyzing system utilization, and exchanging requests and data between the facility 20 and the training facility 22. Input devices, such as a standard computer keyboard 76 and mouse 78, may also be provided to facilitate the user interface. It should be noted that, alternatively, the management system, or other diagnostic system components, may be "stand-alone" or not coupled directly to a diagnostic system. In such cases, the platform described herein, and some or all of the functionality nevertheless may be provided on the management system. Similarly, in certain applications, a diagnostic system may consist of a stand-alone or networked picture archiving communications and retrieval system or a viewing station provided with some or all of the functionality described herein.

The communication modules mentioned above, as well as workstations 72 and 24 may be linked to training facility 22 via a remote access network 80. For this purpose, any suitable network connection may be employed. Presently preferred network configurations include both proprietary or dedicated networks, as well as open networks, such as the Internet. Data may be exchanged between the diagnostic systems, workstations, and remote service facility 22 in any suitable format, such as in accordance with the Internet Protocol (IP), the Transmission Control Protocol (TCP), or other known protocols. Moreover, certain of the data may be transmitted or formatted via markup languages such as the HyperText Markup Language (HTML), or other standard languages. The presently preferred interface structures and communications components are described in greater detail below.

Within training facility 22, messages, requests and data are received by communication components as indicated generally at reference numeral 82. Components 82 transmit the data to a training center processing system, represented generally at reference numeral 84 in FIG. 1. The processing system manages the receipt, handling and transmission of data to and from the training facility. In general, processing system 84 may include one or a plurality of computers, as well as dedicated hardware or software servers for processing the various requests and for receiving and transmitting the data as described more fully below. Training facility 22 also includes a bank of operator workstations 86 which may be staffed by engineers who address the particular requests and provide off and on-line assistance to the diagnostic systems in response to their requests. Also, processing system 84 may be linked to a system of databases or other processing systems 88 at or remote from the training facility 22. Such databases and processing systems form an information library which may include extensive information on various health care topics, training courses, and so forth. As described below, such databases may be employed for training and testing both end-users of particular diagnostic systems and health care professionals in general.

Figure 2:
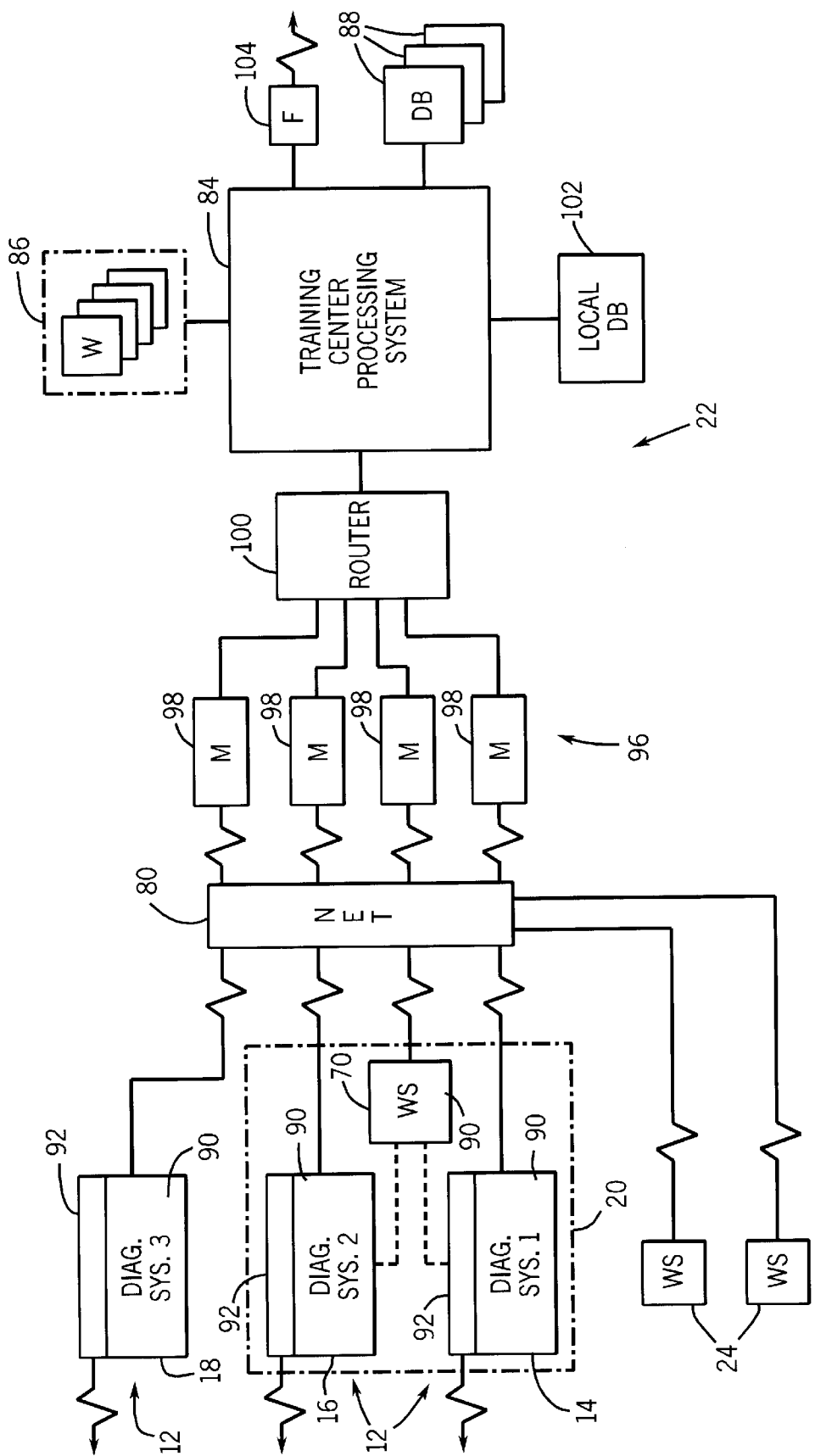
FIG. 2 is a block diagram of the systems shown in FIG. 1 illustrating certain functional components of the diagnostic systems and the training facility.

FIG. 2 is a block diagram illustrating the foregoing system components in a functional view. As shown in FIG. 2, the workstations 24 and the diagnostic systems 12 can be linked to the training facility 22 via a network connection as illustrated generally at reference numeral 80. Within each diagnostic system 12, a uniform platform 90 is provided. Platform 90, which is described in greater detail below with particular reference to FIG. 3, includes hardware, firmware, and software components adapted for composing requests, transmitting and receiving data, establishing network connections and managing financial or subscriber arrangements between diagnostic systems and the training facility. The platforms provide a uniform graphical user interface at each diagnostic system. Where a management station 70 is provided, a similar uniform platform is preferably loaded on the management station to facilitate direct interfacing between the management station and the training facility. In addition to the uniform platform 90, each diagnostic system is preferably provided with an alternative communications module 92, such as a facsimile transmission module for sending and receiving facsimile messages between the scanner and remote training facility.

Messages and data transmitted between the diagnostic systems and the training facility traverse a security barrier or "firewall" contained within processing system 84 as discussed below, which prevents unauthorized access to the facility in a manner generally known in the art. A modem rack 96, including a series of modems 98, receives the incoming data, and transmits outgoing data through a router 100 which manages data traffic between the modems and the processing system 84.

As mentioned above, the processing system 84 receives and processes the requests and data, and interfaces with additional components, both at the training facility and remote from the facility. In the diagram of FIG. 2, operator workstations 86 are coupled to the processing system, as are remote databases or computers 88. In addition, at least one local service database 102 is provided for verifying license and contract arrangements, storing record files, log files, and so forth. Moreover, one or more communication modules 104 are linked to processing system 84 to send and receive facsimile transmissions between the training facility and the diagnostic systems or workstations.

Figure 3:
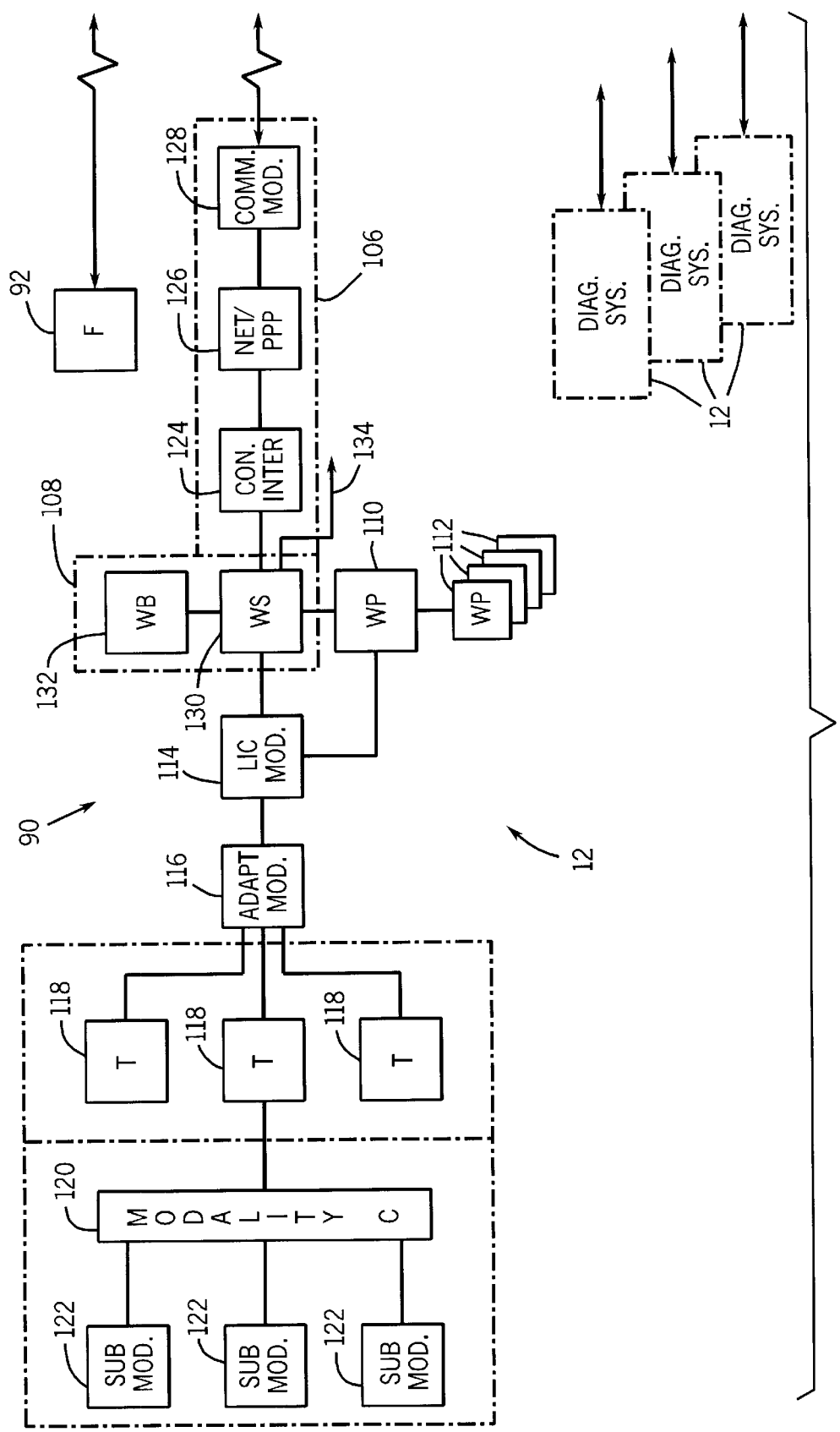
FIG. 3 is a block diagram of certain functional components within a diagnostic system of the type shown in FIGS. 1 and 2 for facilitating remote training at the diagnostic system.

FIG. 3 illustrates diagrammatically the various functional components comprising the uniform platform 90 within each diagnostic system 12. As shown in FIG. 3, the uniform platform includes a device connectivity module 106, as well as a network connectivity module 108. Network connectivity module 108 accesses a main web page 110 which, as mentioned above, is preferably a markup language page, such as an HTML page displayed for the system user on a monitor at the diagnostic system. Main web page 110 is preferably accessible from a normal operating page in which the user will configure examination requests, view the results of examinations, and so forth such as via an on-screen icon. Through main web page 110, a series of additional web pages 112 are accessible. Such web pages permit service requests to be composed and transmitted to the remote service facility, and facilitate the exchange of other messages, reports, software, protocols, and so forth as described more fully below. It should be noted that as used herein the term "page" includes a user interface screen or similar arrangement which can be viewed by a user of the diagnostic system, such as screens providing graphical or textual representations of data, messages, reports and so forth. Moreover, such pages may be defined by a markup language or a programming language such as Java, per, java script, or any other suitable language.

Network connectivity module 108 is coupled to a license module 114 for verifying the status of license, fee or contractual subscriptions between the diagnostic system and the training facility. As used herein, the term "subscription" should be understood to include various arrangements, contractual, commercial or otherwise for the provision of services, information, software, and the like, both accompanied with or without payment of a fee. Moreover, the particular arrangements managed by systems may include several different types of subscriptions, including time-expiring arrangements, one-time fee arrangements, and so-called "pay per use" arrangements, to mention but a few.

License module 114 is, in turn, coupled to one or more adapter utilities 116 for interfacing the browser, server, and communications components with modality interface tools 118. In a presently preferred configuration, several such interface tools are provided for exchanging data between the system scanner and the training platform. For example, modality interface tools 118 may include applets or servlets for building modality-specific applications, as well as configuration templates, graphical user interface customization code, and so forth. Adapters 116 may interact with such components, or directly with a modality controller 120 which is coupled to modality-specific subcomponents 122. The modality controller 120 and modality-specific subcomponents 122 will typically include a preconfigured processor or computer for executing examinations, and memory circuitry for storing image data files, log files, error files, and so forth. Adapter 116 may interface with such circuitry to convert the stored data to and from desired protocols, such as between the HyperText Transfer Protocol (HTTP) and DICOM, a medical imaging standard for data presentation. Moreover, transfer of files and data as described below may be performed via any suitable protocol, such as a file transfer protocol (FTP) or other network protocol.

In the illustrated embodiment, device connectivity module 106 includes several components for providing data exchange between the diagnostic system and the remote training facility. In particular, a connectivity training module 124 provides for interfacing with network connectivity module 108. A Point-to-Point Protocol (PPP) module 126 is also provided for transmitting Internet Protocol (IP) packets over remote communication connections. Finally, a modem 128 is provided for receiving and transmitting data between the diagnostic system and the remote training facility. As will be appreciated by those skilled in the art, various other network protocols and components may be employed within device connectivity module 106 for facilitating such data exchange.

Network connectivity module 108 preferably includes a server 130 and a browser 132. Server 130 facilitates data exchange between the diagnostic system and the service facility, and permits a series of web pages 110 and 112 to be viewed via browser 132. In a presently preferred embodiment, server 130 and browser 132 support HTTP applications and the browser supports java applications. Other servers and browsers, or similar software packages may, of course, be employed for exchanging data, service requests, messages, and software between the diagnostic system, the operator and the remote training facility. Finally, a direct network connection 134 may be provided between server 130 and an operator workstation, such as management station 70 within the medical facility (see FIGS. 1 and 2).

Figure 4:
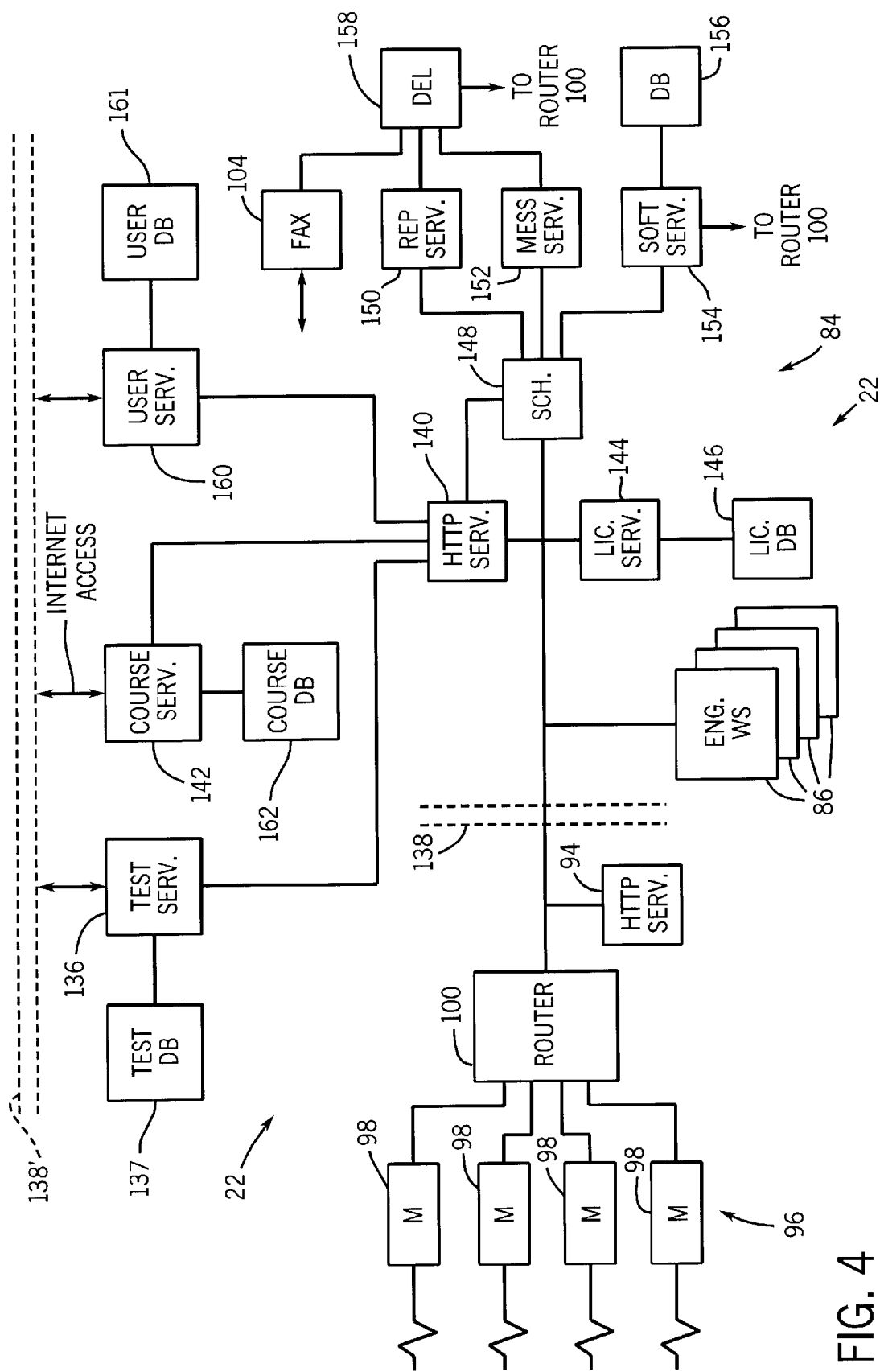
FIG. 4 is a block diagram of certain of the functional components of the training facility illustrated in FIGS. 1 and 2 for rendering remote training to a plurality of medical diagnostic systems.

FIG. 4 illustrates exemplary functional components for training facility 22. As indicated above, training facility 22 includes a modem rack 96 comprising a plurality of modems 98 coupled to a router 100 for coordinating data communications with the facility. An HTTP service server 94 receives and directs incoming and outgoing transactions with the facility. Server 94 is coupled to the other components of the facility through a firewall 138 for system security. Operator workstations 86 are coupled to the port manager for handling requests and transmitting messages and reports in response to such requests. Other network or communications schemes, such as systems including outside Internet service providers (ISP's), virtual private networks (VPN's) and so forth, may be provided for enabling the training facility to communicate and exchange data and messages with diagnostic systems and remote workstations.

Behind firewall 138, an HTTP application server 140 coordinates handling of requests, requests for competency tests, training courses and user profiles or transcripts, messaging, reporting, software transfers and so forth. Other servers may be coupled to HTTP server 140, such as test server 136, configured to address specific requests for competency tests, course server 142, configured to address requests for training courses, including training videos, and user server 160, configured to address requests for user files. In response to a request for a competency test from a health care professional at a diagnostic system, the competency test server 136 retrieves the test data for the requested test from a test database 137 and transmits that test data to the remote site via HTTP server 140 and router 100. In the alternative, the competency test server 136 may receive a request for a test from a remote site via the Internet through a firewall 138'. In the latter case, the test is sent by the competency test server 136 to the remote site via the Internet. Similarly, requests for training courses are handled by course server 142, which accesses a course database 162 to retrieve the appropriate course. If the training course is on video, course server 142 will access a video database (not shown) to retrieve video/audio data to send to the remote site. In addition, an end-user at the remote site can request his/her own personal record, which may include information, such as area of specialty, assessments from any competency tests, lists of suggested courses and completed courses, and so forth. User server 160 will then search the user database 161 to locate the user's profile.

In accordance with a preferred embodiment of the invention, a competency test, training course or user profile may be requested from a workstation 24 at a remote site and viewed at that workstation. The competency test, training course or user profile may be selected and viewed by connecting to the respective competency test server 136, course server 142 or user server 160 at the central training facility via the Internet.

In the illustrated embodiment, processing system 84 also includes a license server 144 which is coupled to a license database 146 for storing, updating and verifying the status of diagnostic system subscriptions. Alternatively, where desired, license server 144 may be placed outside of fire wall 138 to verify subscription status prior to admission to the training facility.

Handling of requests, messaging, and reporting is further coordinated by a scheduler module 148 coupled to HTTP server 140. Scheduler module 148 coordinates activities of other servers comprising the processing system, such as a report server 150, a message server 152, and a software download server 154. As will be appreciated by those skilled in the art, servers 150, 152 and 154 are coupled to memory devices (not shown) for storing data such as addresses, log files, message and report files, applications software, and so forth. In particular, as illustrated in FIG. 4, software server 154 is coupled via one or more data channels to a storage device 156 for containing transmittable software packages which may be sent directly to the diagnostic systems, accessed by the diagnostic systems, or supplied on pay-per-use or purchase basis. Message and report servers 152 and 154 are further coupled, along with communications module 104, to a delivery handling module 158, which is configured to receive outgoing messages, insure proper connectivity with diagnostic systems, and coordinate transmission of the messages.

In a preferred embodiment, the foregoing functional circuitry may be configured as hardware, firmware, or software on any appropriate computer platform. For example, the functional circuitry of the diagnostic systems may be either programmed as appropriate code in a personal computer or workstation, or incorporated entirely in or added to the system scanner. The functional circuitry of the training facility may be include additional personal computers or workstations, in addition to a main frame computer in which one or more of the servers, the scheduler, and so forth, are configured. In addition, the workstations 24 may comprise personal computers or laptop computers of any suitable processor platform. It should also be noted that the foregoing functional circuitry may be adapted in a variety of manners for executing the functions described herein. In general, the functional circuitry facilitates the exchange of data between the diagnostic systems and a central training facility, which is preferably implemented in an interactive manner.

Figure 5:
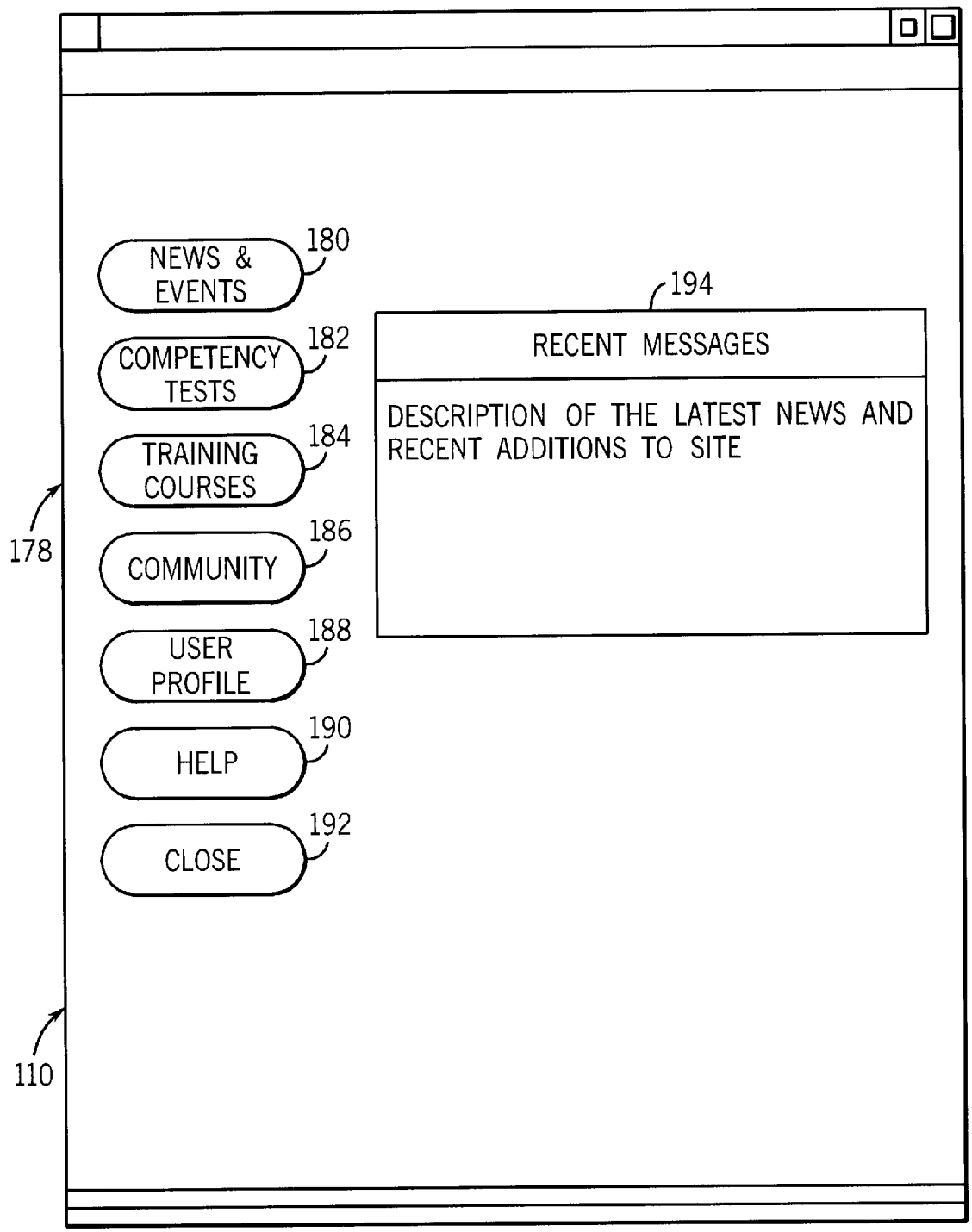
FIG. 5 is an exemplary user interface page incorporated in the remote diagnostic system (or workstation) for placing requests, and sending and receiving competency test and training course data between the training facility and the remote diagnostic system.

As described above, the diagnostic systems and associated workstations facilitate interfacing with the central training facility via a series of interactive user-viewable pages. FIG. 5 illustrates an exemplary main web page 110, which is accessible from a diagnostic system screen viewable on a monitor (e.g., monitors 36, 52 or 66) or from a workstation. Main web page 110 includes a menu 178 of navigational devices in the form of graphical (i.e., virtal) buttons for accessing other interface pages in the graphical user interface. In the illustrated embodiment, these graphical devices include a news and events button 180 for accessing a news and events page, a competency tests button 182 for accessing a competency tests page, a training courses button 184 for accessing training courses, a community button 186 for accessing additional resources, and a user profile button 188 for accessing a user profile page. A help button 190 is provided for accessing user information, help topics, and so forth, which may be resident on the system, or available through online sources viewable through the system browser. A close or exit button 192 is provided for returning to the normal scanner interface page. In addition to these navigational devices, main page 110 includes a message area 194, in which information regarding the latest news and recent additions to the site are displayed.

Figure 6:
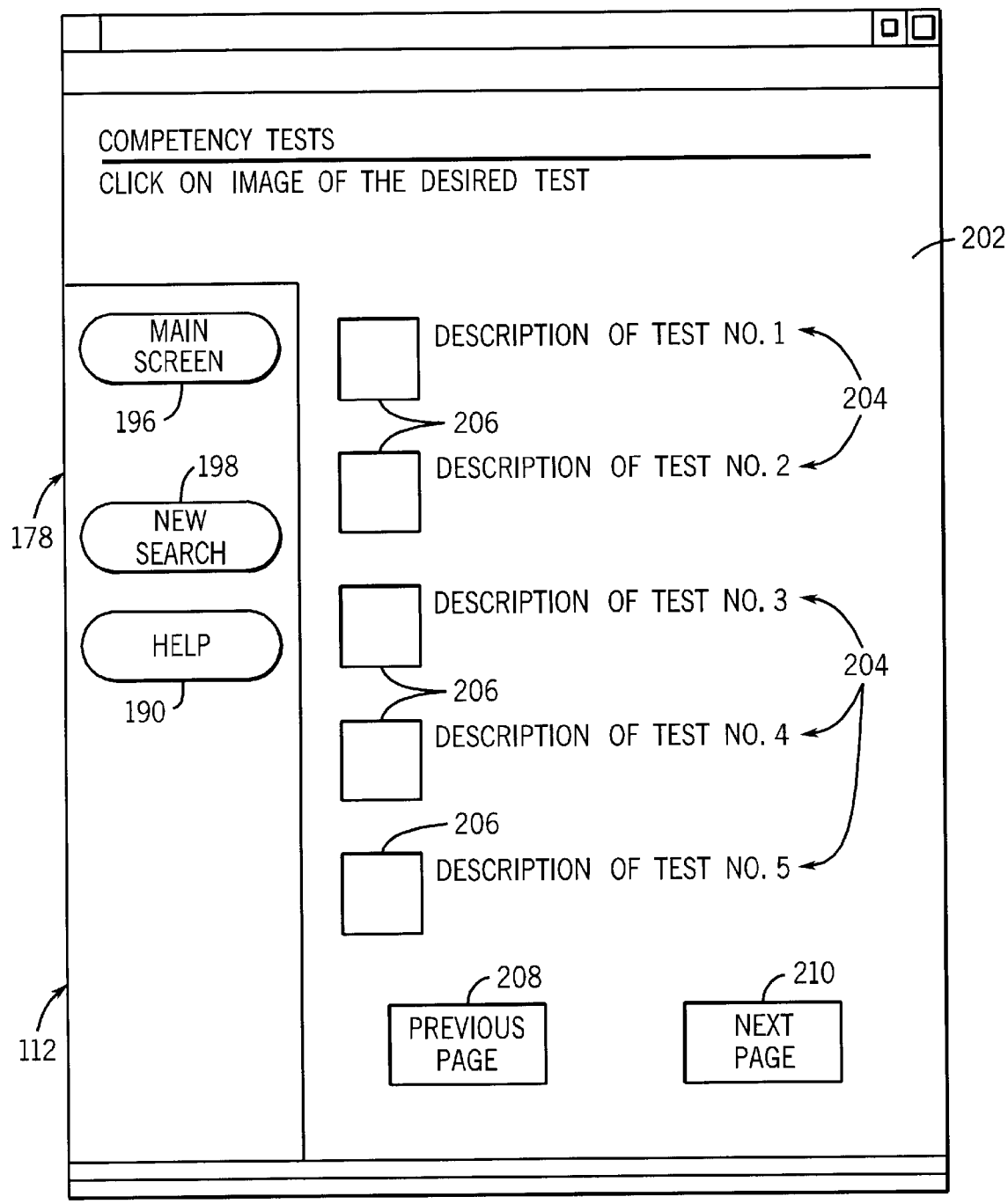
FIG. 6 is a second user interface page for displaying a list of competency tests and sending to the training facility a request for a test.

FIG. 6 illustrates a competency tests web page 112 accessed by actuation of the competency tests button 182 on the main web page (see FIG. 5). The competency tests web page includes a main menu button 196 for returning to the main page shown in FIG. 5. In addition, a new search button 198 is provided for search for additional tests. As mentioned above, the uniform graphical user interface facilitates formulation of competency test requests and enables system designers to permit accessing of a central training facility in a similar manner across several diagnostic system modalities.

As seen in FIG. 6, the competency tests web page 112 is formatted to provide a graphical user interface for searching and selecting competency tests from the test database. Preferably, the tests are classified by area of specialty and user profession (e.g., physician, nurse, biomedical engineer or administrator). In response to information, such as profession and area of specialty or desired health care topic, input by the user at a prior web page (not shown), the competency tests web page displays a list of available competency tests relating to the selected profession and specialty or topic. A first page of an exemplary list is generally depicted in FIG. 6. A series of competency tests are listed within a text area 202. For each test provided in the listing, a brief description of the subject matter of the test is provided as indicated at reference numerals 204. Each entry on the list also includes a respective virtal selection button 206. Optionally, each virtal selection button may have a condensed image or thumbnail sketch symbolizing the subject matter of the respective test superimposed thereon. Prior to selection, the end-user can scroll through the list of tests by clicking on the Previous Page button 208 and Next Page button 210 in a well-known manner. Other buttons, such as First Page and Last Page buttons (not shown) may also be included. From time to time competency tests may be added to the listing, such as by downloading from the training facility.

A competency test corresponding to an entry on the displayed page can be selected by clicking on the corresponding virtual selection button 206. Referring back to FIG. 2, the request is transmitted from the diagnostic system or workstation to the training facility 22 via the network 80. If the diagnostic system or workstation has a valid subscription, the training facility download the requested test to the diagnostic system or workstation via the network 80.

Referring to FIG. 4, the HTTP applications server 140 receives information from the license module 144 that the end-user at the remote facility is licensed to access the requested test and then passes the request for the test on to the test server 136. The test server is programmed with the capability to retrieve the requested test from the test database or library 137. The test server 136 then sends the test to the remote location via the delivery handling module 158, router 100, a modem 98 and network 80. The end-user can then take the test online, inputting via an input device, such as a keyboard, mouse, trackball, etc., at the diagnostic system or workstation his/her response or answer to each question of the competency test.

Figure 7:
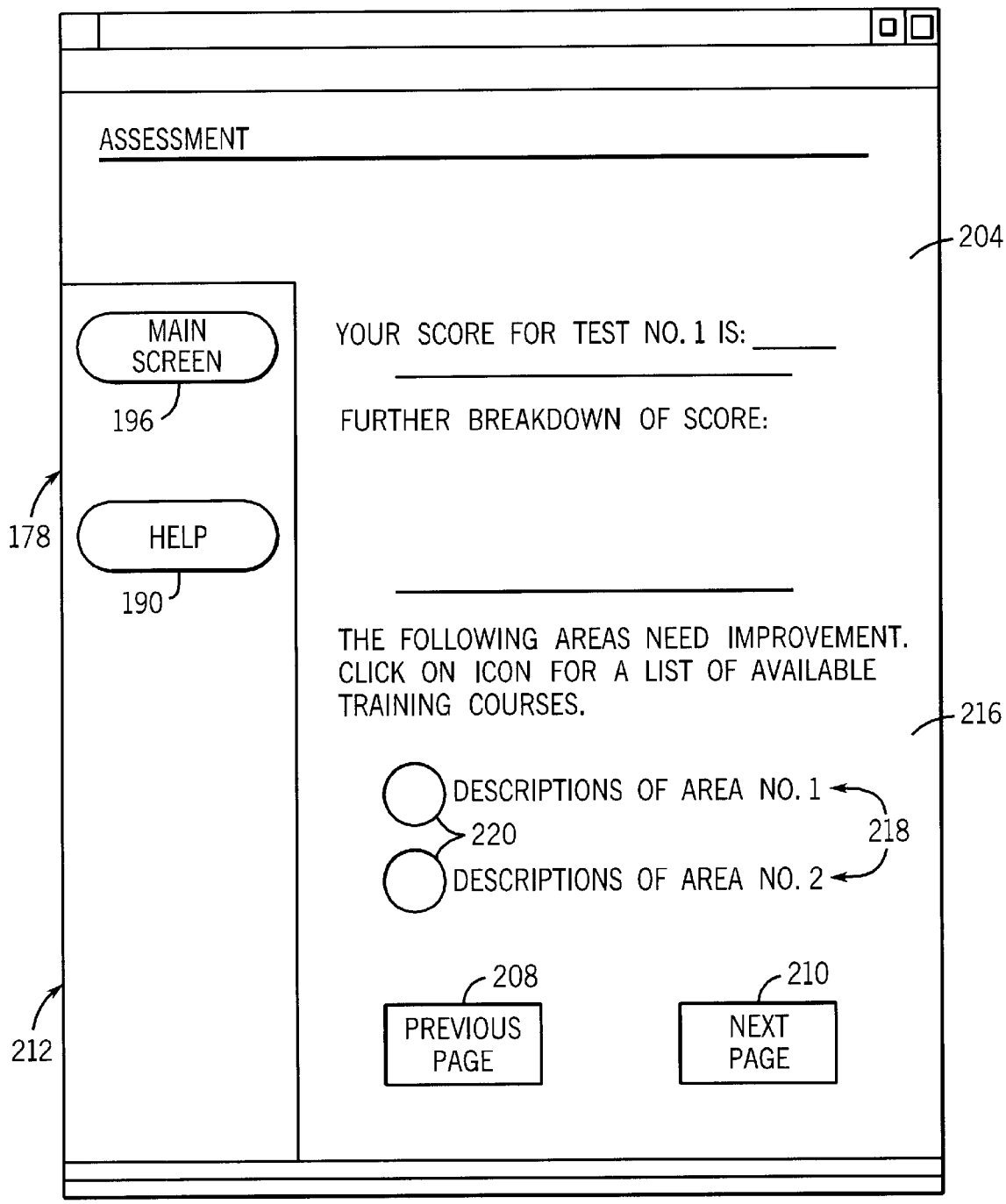
FIG. 7 is a user interface page for displaying the results from a user's competency test, including indicating any areas of deficiency and displaying a list of recommended training courses.

The end-user's answers to the test are then scored and evaluated at the training facility and feedback is provided to the user at the remote location. FIG. 7 illustrates an assessment page 212 which displays to the user the results of the competency test. The assessment page 212 includes a first text area 214, which provides general summary information, and a second text area 216, which particularly points out any areas of deficiency. First text area 214 can include an overall score as well as a breakdown of that score into additional categories. Second text area 216 provides more detailed information as to those areas, if any, in which the end-user should seek additional training and education. For each area of improvement listed, a brief description of that area is provided as indicated at reference numerals 218 along with a respective virtual selection button 220 for accessing a list of relevant training courses.

Figure 8:
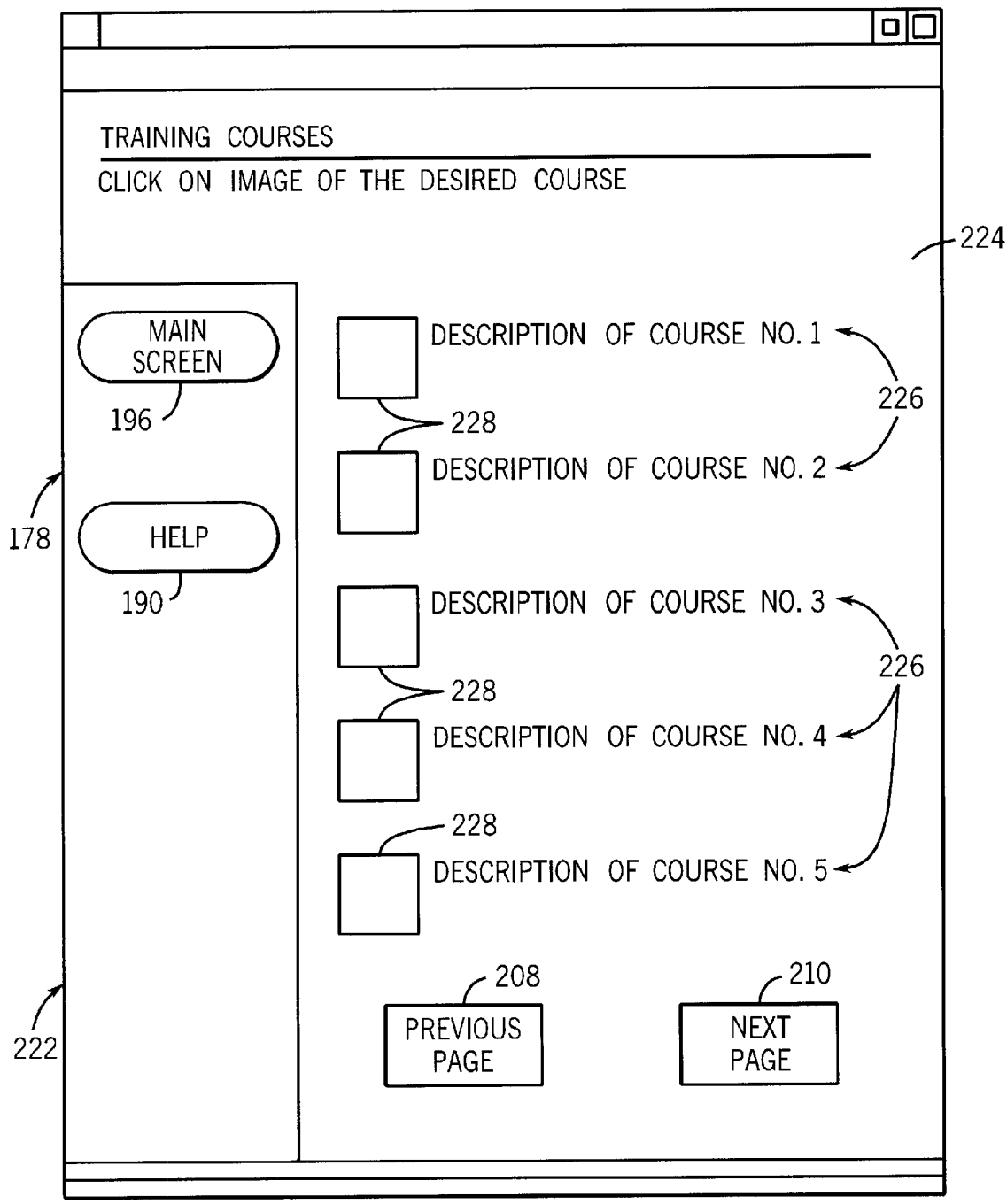
FIG. 8 is a user interface page for displaying a list of training courses and sending to the training facility a request for a course.

FIG. 8 illustrates a training courses page 222 accessed by actuation of one of the improvement area buttons 220 on the assessment page 212. The training course page 222 includes a list of recommended training courses for the particular topic and has a format similar to that of the competency tests page (see FIG. 6). In a text area 224 are a list of courses, each with a description 226 and an associated virtual selection button 228. The user can access additional information for a particular course by clicking on the appropriate virtual selection button 228. The request is transmitted to the training facility where the additional information is accessed via the course server 142 and course database 162 and downloaded to the diagnostic system or workstation at the remote location. If the course is available online, including a course on a video that can be downloaded and viewed in real time at the remote location, the training facility will transmit the actual course to the remote site. Alternatively, if the course is not available online, a graphical user interface page (not shown) will inform the user as to how to access the course, whether by audio or video tape, CD-ROM, live/broadcast seminar (including a schedule of locations and times), and so forth.

Figure 9:
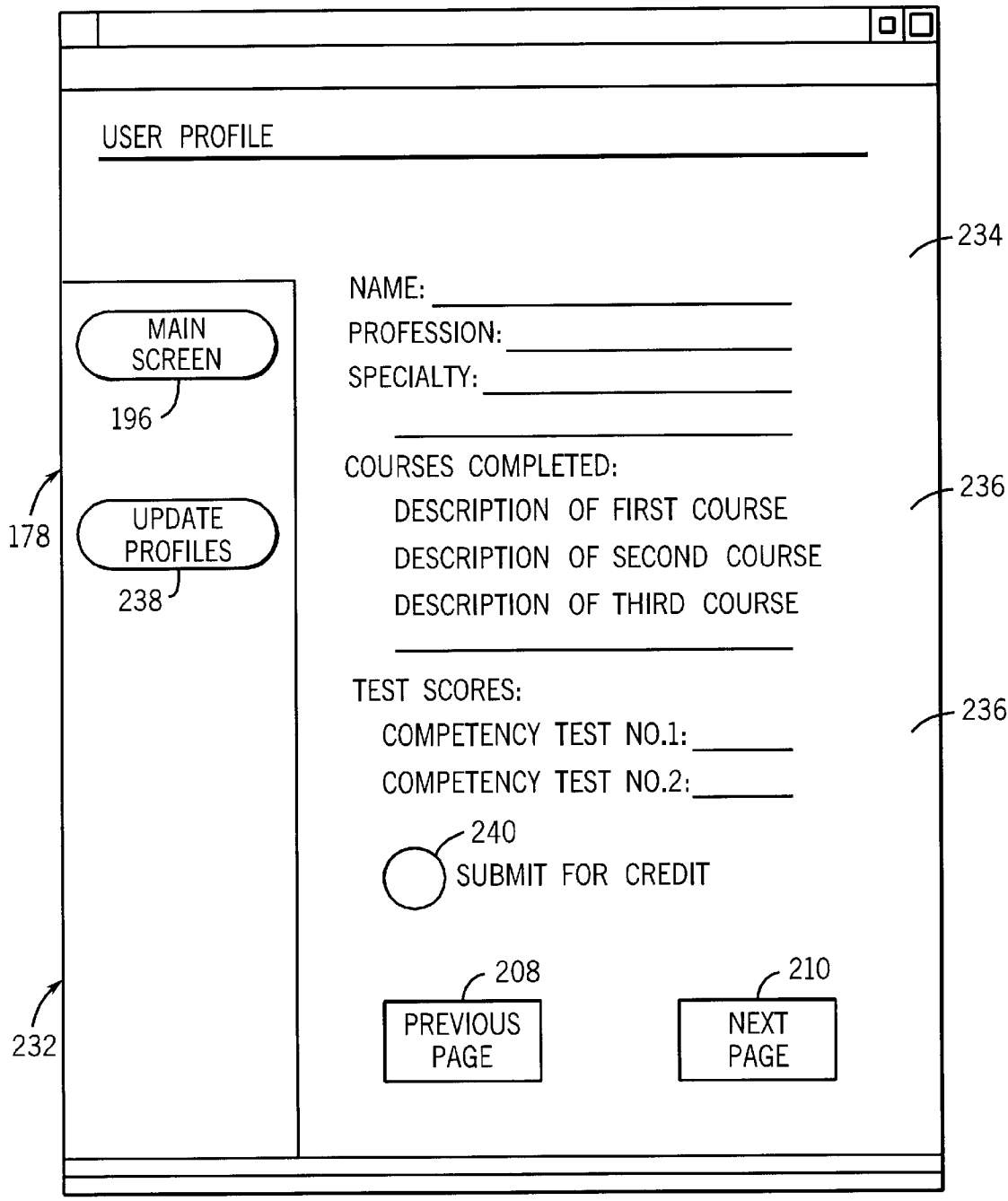
FIG. 9 is a user interface page for displaying a user's profile, including a record of courses completed by the user, and for updating and submitting the user's record to a state licensing entity or other organization.

FIG. 9 illustrates a user profile page 232, where a user can keep track of any completed courses. The user profile page 232 may be analogous to a transcript and includes a first text area 234 with basic user information, such as the user's name, profession and any area of specialty. In addition, the user profile page 232 includes a second text area 236 and a third text area 238, which respectively provide a listing of completed training courses and competency tests scores. Information provided on the user information page 232 is stored at the training facility 22 in the user database 161 and can be accessed via the user server 160 (see FIG. 4). The information stored in the user database 161 may be accessed either by an individual health care professional desirous of his/her own record or by a health care facility administrator seeking information about the knowledge of the staff. Thus, access to this database can enable a health care facility administrator to identify the pool of available knowledge at the facility.

The user profile page 232 also includes an update profile button 238, which enables a user to update the information listed on the user profile page 232. When the user clicks on the update profile button 238, another user interface page (not shown) will appear. The user can then update any of the base user information in the first text area 234 as well as input additional completed courses and competency test information.

Also included on the user profile page 232 is a graphical button 240 for submitting the user's transcript to state licensing entity or other certifying organization. When a user has completed the coursework required for certification or continuing education, the user can select the submit for credit button 240 to have a record of his/her coursework sent directly to the licensing entity or certifying organization. Referring back to FIG. 1, training facility 22 is also linked to a licensing or certifying entity 242 via the network 80 and can on command transfer this information to the entity. Alternatively, clicking on the submit for credit button 240 on the user profile page 232 can generate a message at the training facility to generate a report for the user and send the report via regular mail or facsimile to the licensing entity. The user profile page 232 provides a convenient way for users to maintain a log of any continuing education courses and simplifies the licensing and certification process.

Figure 10:
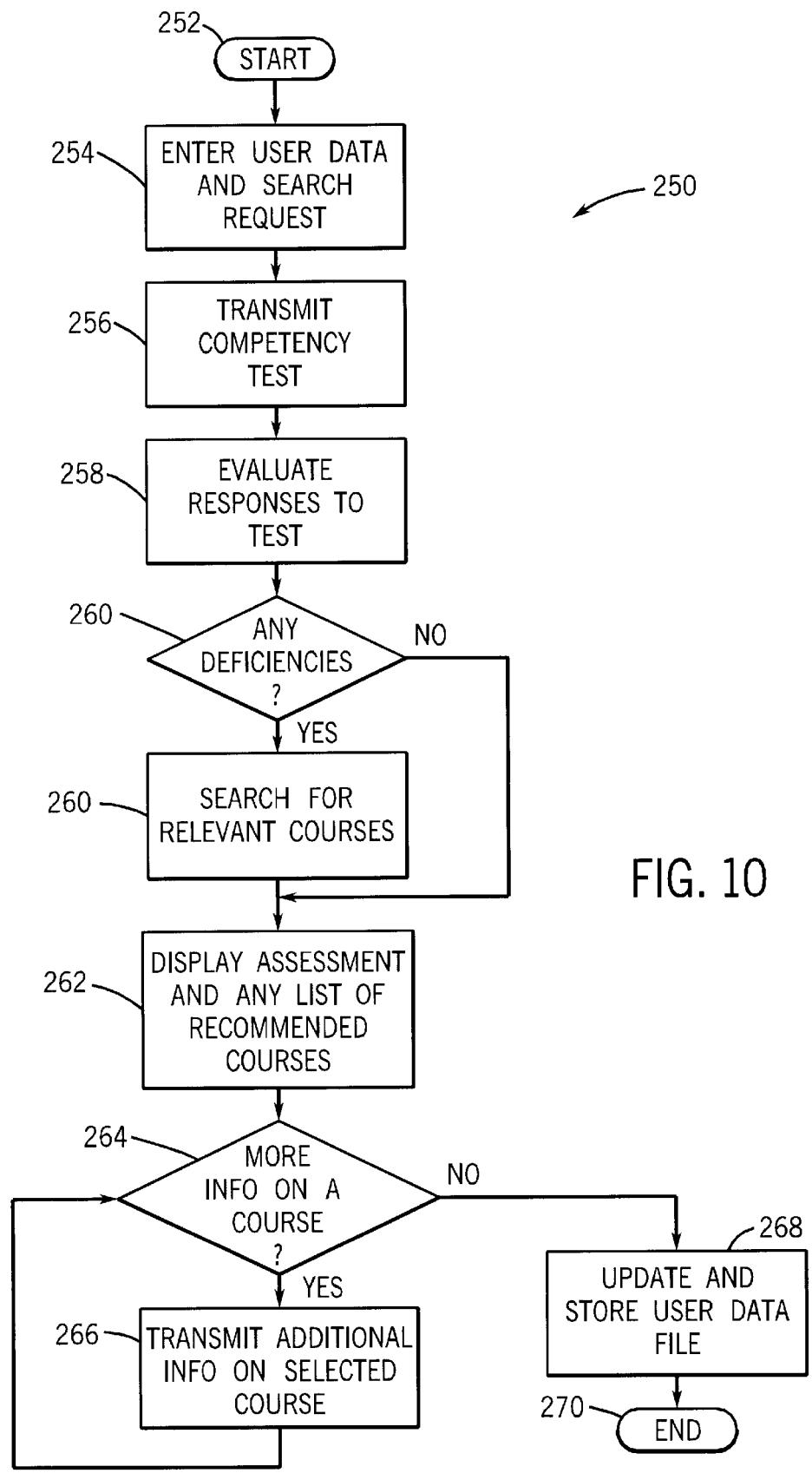
FIG. 10 is a flow chart illustrating exemplary logic for requesting competency tests and training courses.

FIG. 10 illustrates exemplary control logic for a remote diagnostic system or workstation to access the training facility's competency tests and training courses. The control logic, indicated generally by reference numeral 250, begins at step 252. At step 254, a user at the remote diagnostic system or workstation enters the user's personal information. This information can include the user's name, profession, area of specialty, if any, and so forth. The user can also input additional information and request a particular competency test or simply have the test server 136 at the training facility 22 locate tests based on the user's profession and area of specialty. A list of the relevant tests found in the test database 137 is compiled and transmitted to the remote site, where the user then selects one of the tests from the competency tests page 112.

At step 256, the requested test is transmitted from the training facility 22 to the user at the remote location. The test is administered online, and the user's responses to questions in the test are transmitted back to the training facility. At step 258, the test is scored and the user's responses are evaluated. In particular, any areas in which the user has inadequate knowledge are noted.

If at step 260 there are areas of deficiency, the system proceeds to step 260. At step 260, the course server 142 searches the course database 162 for a list of relevant courses. At step 262, this list and an overall assessment of the user's test are displayed at the remote site via the assessment page 212 and the training courses page 222 described above. If the test results indicate that there are no areas of deficiency, the system proceeds to step 262 and displays the assessment, leaving the text area 216 of the assessment page 212 blank.

At step 264, the user has the option of accessing further information of any one of the listed training courses. If the user desires additional information about a particular course, the user can click on the appropriate virtual selection button 228 on the training courses page 222. The course server 142 at the training facility 22 will retrieve the course information from the course database 162 and transfer it to the remote site, where the user can view the course information.

If at step 264, the user does not want additional information about any of the courses listed, the system proceeds to step 268 where it updates and stores the data in a user file. The profile of the user is stored in the user database 161, which can later be accessed by the user server 160 at the training facility 22. The system then proceeds to step 270 and ends. It should be noted that the system does not always need to proceed with steps 256 through 260. If a user wants access to the training course information without taking a test, the system can skip from step 254 to step 260 and search for a list of courses on the requested topic and then proceed from there.

Figure 11:
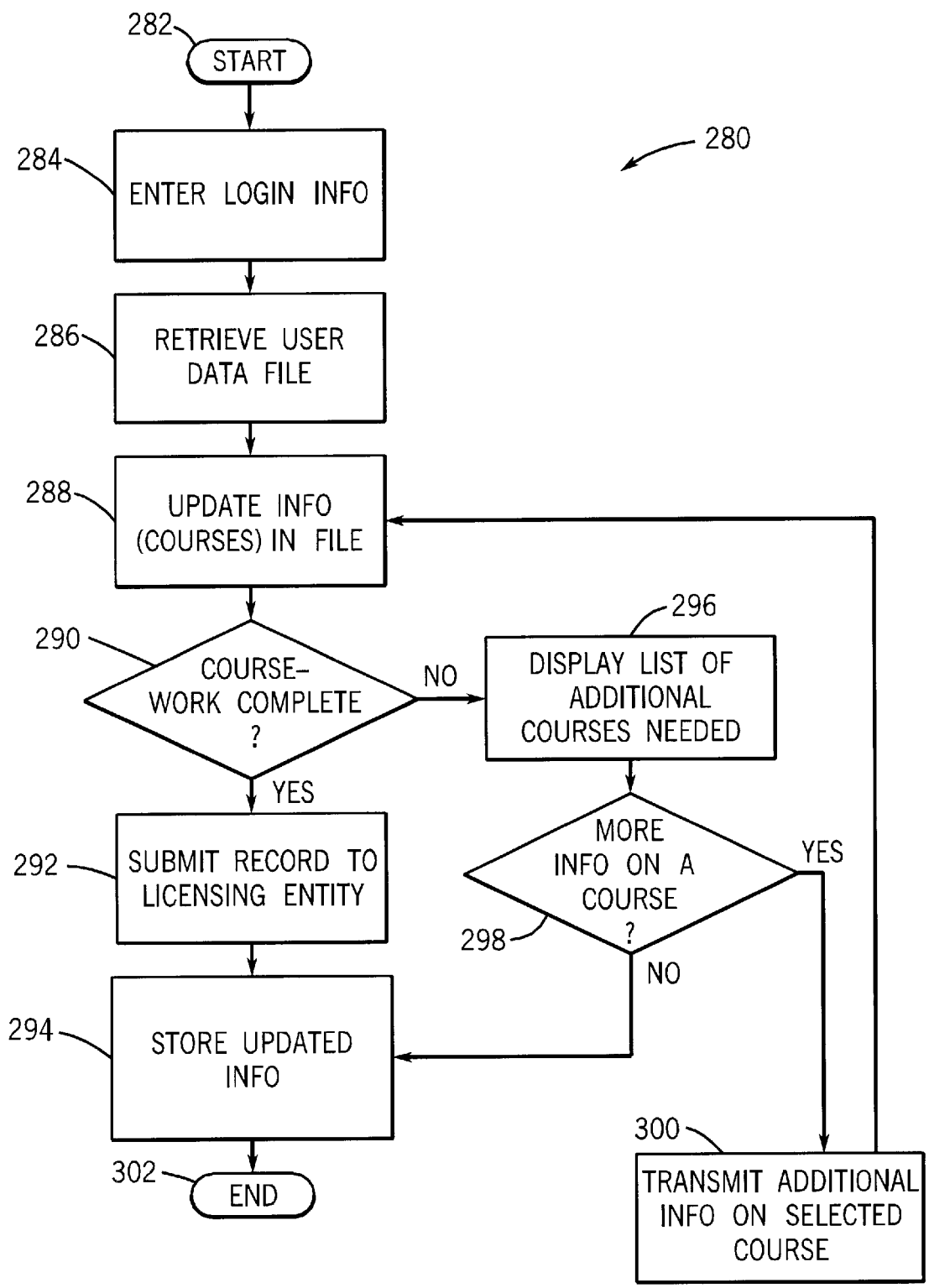
FIG. 11 is a flow chart illustrating exemplary logic for updating a user profile and submitting a record to a licensing entity or organization.

FIG. 11 illustrates exemplary control logic for a user at a remote diagnostic system or workstation to access his or her personal file from the training facility and to submit a transcript to a state licensing entity or other certifying organization. The control logic, indicated generally by reference numeral 280, begins at step 282. At step 284, a user at the remote diagnostic system or workstation enters his/her login information. The user's login information can include a user name and password. Based on this information, the user server 160 at the training facility will search the user database 161 for the user file.

At step 286, the user's file is transferred from the training facility to the diagnostic system or workstation at the remote location. The user can view a personal user profile page 232, which includes competency test scores and a list of completed courses.

At step 288, the user can update the file by clicking on the update profile button 238. As discussed earlier, another user interface page, on which the user can add courses and competency tests, appears. The user can input training courses that were completed offline, so that all of the user's continuing education information is stored in a single file.

The system then proceeds to step 290, where the system checks whether the user has completed enough courses or for certification or continuing education requirements. If the user has completed the necessary coursework, the user can then submit for credit a record to the state licensing entity or certifying organization. As described above, by clicking on the submit for credit button 240 on the user profile page 232, a record of the user's transcript will be sent to the licensing entity via the network, or by regular mail or facsimile.

If the user has not acquired enough courses for certification or continuing education requirements, the system at step 296 then displays a list of additional courses needed. At step 298 the user can choose whether to display additional information on any one of the listed courses. If the user selects additional information on a course, at step 300, that information is downloaded to the remote site, where the user can view the information. The system then returns to step 288 and to update the user's file.

At step 298, if the user does not want additional information on any of the listed courses, the system proceeds to step 294 where it stores the updated user file in the user database 161 at the training facility. Finally, the system then proceeds to step 302 and ends.

While the invention has been described with reference to preferred embodiments, it will be understood by those skilled in the art that various changes may be made and equivalents may be substituted for elements thereof, without departing from the scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but rather that the invention will include all embodiments falling within the scope of the appended claims.

As used in the claims, the term "provider system" includes diagnostic systems, imaging systems, and workstations.

What is claimed is:

1. A method for testing and training a health care professional, the method comprising:
    storing on machine readable media at least one competency test;
    establishing a network link between a distribution system and a remote medical diagnostic system;
    transmitting to the remote medical diagnostic system the at least one competency test;
    receiving responses to the competency test from a health care professional input at the remote medical diagnostic system;
    evaluating the skills of the health care professional based on the responses to the competency test; and
    analyzing the responses and displaying an assessment of the skills of the health care professional, the assessment indicating one or more areas of deficiency, if any.

2. The method of claim 1, wherein the remote medical diagnostic system is a workstation of a diagnostic imaging system.

3. The method of claim 1, further comprising searching the machine readable media for a list of relevant courses.

4. The method of claim 3, further comprising transmitting a course from the list of relevant courses to the remote medical diagnostic system, wherein the course is transmitted in response to a selection input by the health care professional at the remote medical diagnostics system.

5. The method of claim 1, further comprising storing on the machine readable media the assessment for the health care professional.

6. The method of claim 1, further comprising storing a record of courses completed by the health care professional.

7. The method of claim 6, further comprising providing the record of courses completed by the health care professional to a licensing entity for credit.

8. The method of claim 7, wherein providing the record to the licensing entity comprises:
    establishing a network link to a system at the licensing entity; and
    transmitting to the licensing entity the record of courses completed by the health care professional.

9. A method of testing and training a first health care professional and a second health care professional, the first and second health care professionals being located at respective first and second provider systems, the method comprising:
    storing on machine readable media a first competency test and a second competency test, the first competency test pertaining to a first health care area, the second competency test pertaining to a second health care area;
    establishing network links between a distribution system and the first and second medical diagnostic systems;
    transmitting to the first and second medical diagnostic systems the first and second competency tests, respectively;
    receiving responses to the first and second competency tests input by the first and second health care professionals at the first and second medical diagnostic systems, respectively;
    evaluating the skills of the first and second health care professionals based on responses input by the first and second health care professionals at the respective first and second provider systems;
    displaying at the first and second medical diagnostics systems a respective first and second assessment, the first assessment being indicative of skills of the first health care professional in the first health care area and indicating any areas of deficiency, the second assessment being indicative of skills of the second health care professional in the second health care area and indicating any areas of deficiency; and
    displaying at the first medical diagnostic system user viewable indicia, the indicia being representative of a list of relevant courses for improving the areas of deficiency in the first health care area.

10. The method of claim 9, wherein the first and second medical diagnostic systems are workstations of diagnostic imaging systems.

11. The method of claim 9, wherein each medical diagnostic system is one of a magnetic resonance imaging system, a nuclear medicine system, a positron emission tomography system, a computed tomography imaging system, an ultrasound imaging system, and an x-ray imaging system.

12. The method of claim 9, further comprising searching the machine readable media for the list of relevant courses.

13. The method of claim 9, further comprising storing on the machine readable media the first and second assessments for the respective first and second health care professionals.

14. The method of claim 9, further comprising transmitting a course from the list of relevant courses to the first medical diagnostic system, wherein the course is transmitted in response to a selection input by the first health care professional at the first medical diagnostic system.

15. The method of claim 14, further comprising storing a record of courses completed by the first health care professional.

16. The method of claim 15, further comprising providing the record of courses completed by the first health care professional to a licensing entity for credit.

17. The method of claim 16, wherein providing the record to the licensing entity includes:
    establishing a network to a system at the licensing entity; and
    transmitting to the licensing entity the record of courses completed by the first health care professional.

18. A system for testing and training a health care professional at a remote location, the system comprising:
    at least one storage device for storing a plurality of training courses and a plurality of competency tests;

communications circuitry for establishing a network link between the at least one storage device and a medical diagnostic system at the remote location, for transmitting a competency test to the medical diagnostic system, for receiving responses to the competency test, the responses being input by the health care professional at the remote medical diagnostic system, and for displaying an assessment of the skills of the health care professional, wherein the assessment indicates any areas of deficiency; and means for searching the at least one storage device in response to the assessment to locate training courses relevant to the areas of deficiency.

19. The system of claim 18, wherein the communications circuitry can transmit a training course to the medical diagnostic system in response to a selection input by the health care professional at the medical diagnostic provider system.

20. The system of claim 18, wherein the at least one storage device includes a record of courses completed by the health care professional.

21. The system of claim 18, wherein communications circuitry can establish a network link to a licensing entity and transmit to the licensing entity the record of courses completed by the health care professional for credit.

* * * * *